Patented Feb. 3, 1953

2,627,514

UNITED STATES PATENT OFFICE 2,627,514

BLOWN TALL OIL REACTION PRODUCTS

Willard H. Kirkpatrick, Sugar Land, Tex., and Earl T. Kocher, Bellflower, Calif., assignors to Visco Products Company, Houston, Tex., a corporation of Delaware No Drawing. Original application March 26, 1948, Serial No. 17,386. Divided and this application March 16, 1951, Serial No. 216,088

4 Claims. (Cl. 260—97.5)

This invention relates in particular to compositions suitable for the treatment of emulsions of mineral oil and water, such as petroleum emulsions commonly encountered in the production, handling and refining of crude mineral oil, for the purpose of separating the oil from the water. Also, the invention relates to compositions suitable for the treatment of other water-in-oil types of emulsions wherein the emulsions are produced artificially or naturally and the resolution of the emulsions presents a problem of recovery or disposal.

Petroleum emulsions are, in general, of the water-in-oil type wherein the oil acts as a continuous phase for the dispersal of finely divided particles of naturally occurring waters or brines. These emulsions are often extremely stable and will not resolve on long standing. It is to be understood that water-in-oil emulsions may occur artificially resulting from any one or more of numerous operations encountered in various industries. The emulsions obtained from producing wells and from the bottom of crude oil storage tanks are commonly referred to as "cut oil," "emulsified oil," "bottom settlings," and "B. S."

One object of the invention is to provide novel compositions suitable for resolving emulsions of the character referred to into their component parts of oil and water or brine.

Another object of the invention is to provide novel compositions suitable for "desalting" of refinery crude charge stocks going to the stills. "Desalting" is the conventional term used to designate the operation wherein the salt content of crude oil is substantially reduced. This operation consists of artificially creating an emulsion of crude oil with water and subsequently resolving said emulsion by treatment with one of the reagents described herein. In some instances the treating agent is introduced into the crude charge stock prior to the addition of fresh water in order to prevent the formation of an otherwise uncommonly stable emulsion thus permitting the water to separate and stratify readily carrying with it the dissolved salts in solution.

Still another object of the invention is to provide a novel reagent which is water-wettable, interfacial and surface-active in order to enable its use as a demulsifier or for such uses where surface-active characteristics are necessary or desirable. Other objects will appear hereinafter.

The composition prepared in accordance with the present invention is a complex reaction product derived from the reaction of a blown tall oil, an alkylolamine, preferably triethanolamine, an acidic salt of a metal which forms an amphoteric hyroxide, preferably zinc chloride, and a mixed ester of a polyhydric alcohol with two dissimilar carboxyy acids, one being an unsaturated long chain acyclic carboxy acid containing at least 8 carbon atoms and the other being an unsaturated carbocyclic acidic resin type carboxy acid, for instance, abietic acid. An aqueous distillate will normally begin to form at a temperature of 175° to 180° C. To facilitate the removal of the distillate, an azeotropic solvent is employed, preferably a suitable hydrocarbon fraction such as $SO_2$ extract. The heating is continued at progressively higher temperatures until a major proportion of the chemically available water is removed. In general, the temperatures of heating will be within the range from 175° C. to 300° C. The products obtained are believed to be new compositions of matter and are useful for those uses where water-wettable, interfacial and surface-active properties are necessary or desirable, it being understood, however, that this invention is primarily concerned with the breaking of water-in-oil emulsions.

The polyhydric alcohol employed for the purpose of the invention is preferably a polyethylene glycol. Polyalkylene glycols comprise a series of polymers having the general formula $$HO(C_nH_{2n}OC_nH_{2n})_xOH$$

wherein $n$ and $x$ are the same or different whole numbers. Polyethylene glycols are currently available in technical quantities and are offered in polymeric grades corresponding to molecular weights of 200, 300, 400, 600, 1000, 1500, 1540, 4000 and 6000. Up to a molecular weight of 600, the materials all are viscous, light colored, somewhat hygroscopic liquids of low vapor pressure and are characterized by complete solubility in water and in many organic solvents. Examples of the latter are aliphatic ketones and alcohols, glycol ethers, aliphatic esters and aromatic hydrocarbons. Structurally, the polyethylene glycols are characterized by a large number of ether linkages and two terminal hydroxyl groups so that they are heat stable and inert to many chemical agents. The higher molecular weight polyethylene glycols are bland, odorless solids. The following are the physical properties of the two polyethylene glycols which are our preferred reactants:

*Polyethylene glycols*

|  | 300 | 400 |
|---|---|---|
| Average Molecular Weight | 285 to 315 | 380 to 420. |
| Freezing Range, ° C | −15 to 8 | 4 to 10. |
| Specific Gravity, 20/20, ° C | 1.13 | 1.13. |
| Flash Point, ° F | 385 | 435. |
| Saybolt Viscosity at 210° F., Sec | 42 to 46 | 45 to 55. |
| Water Solubility at 20° C., percent by weight | Complete | Complete. |
| Comparative Hygroscopicity (Glycerol =100) | 70 | 60. |

Simple glycols (e. g., ethylene glycol, propylene glycol), glycerine, polyglycerol and related di- or polyhydroxy compounds can also be employed for the purposes of this invention.

Of the two dissimilar carboxy acids required for esterification, the one is preferably an unsaturated long chain acyclic or fatty type carboxy acid having at least 8 carbon atoms and not more than 32 carbon atoms in the chain. This group of acids may also be called unsaturated detergent forming acids. As examples of acyclic type acids which we have found particularly suitable for our purposes we may mention: linolenic acid, linoleic acid, oleic acid, mixtures thereof, and other commonly available unsaturated long chain acyclic acids. Of these acids, those having a plurality of double bonds (e. g., linoleic acid and linolenic acid) may also be called drying oil acids. Especially good results have been obtained by the practice of the invention with blown esters derived from polyethylene glycols, and mixtures of drying oil and non-drying (e. g., oleic acid) oil fatty acids, blown to a soft viscous condition.

The other dissimilar type of carboxy acid required for our process is a carbocyclic carboxy acid of the terpene type, preferably a rosin acid. The most commonly available rosin acids are abietic acid and related derivatives derived from naval stores. Other acidic resins, e. g., polymerized rosin, dehydrogenated rosin and cracked copals (for example, run Congo) may be employed. These rosin acids may be characterized as oil soluble acidic resins having an acid value of at least 30. In most cases, the acid value will be above 50, and in the case of rosin it exceeds 150.

The dissimilarity of these two types of carboxy acids is characterized by the acyclic type being a long chain carboxy acid, whereas the rosin type is a carbocyclic carboxy acid of the terpene type. In the practice of the invention the weight ratio of the acyclic carboxy acid to the carbocyclic carboxy acid in the mixed ester is preferably within the range of 1:1 to 2:1, the lesser component always being in excess of about 30% of the total carboxy acids.

While any blend of the dissimilar acids can be prepared, our preferred mixture of dissimilar carboxy acids is readily obtainable as a naturally occurring mixture of dissimilar carboxy acids known in the trade as tall oil. Tall oil is the liquid resin obtained in digesting wood to wood pulp in the paper industry. It is a dark brown, viscous liquid containing a crystalline sediment of abietic acid. From the results of several investigators the following principal constituents of tall oil are indicated: resin acids 30–45%, fatty acids 45–60%, unsaponifiable matter 6–12%. The unsaponifiable portion is a yellow viscous oil containing a waxy or pitchy material. The specifications of the particular grade of tall oil which we prefer to use is as follows:

| | |
|---|---|
| Specific gravity (at 15.5° C.) | .9697 |
| Acid number | 164.0 |
| Saponification number | 173.6 |
| Ester number | 9.4 |
| Per cent moisture | 0.0 |
| Per cent rosin | 39.2 |
| Per cent fatty acids (by difference) | 52.79 |
| Per cent linolenic acid | 19.25 |
| Per cent linoleic acid | 10.5 |
| Per cent oleic acid | 23.04 |
| Unsaponifiable per cent | 8.01 |
| Iodine number | 148.83 |
| Thiocyanogen-iodine number | 91.1 |
| Per cent saturated fatty acids | None |
| Per cent unsaturated fatty acids | 100 |
| Titer test | 5.5° C. |
| Pour test | 4.4° C. |
| Cloud test | 10–12.8° C. |

The preparation of the mixed dissimilar carboxy acid esters of polyalkylene glycols or their indicated equivalents is carried out in any of the well known conventional esterification procedures with or without catalysts. We prefer to carry out the esterification reaction by mixing the carboxy bodies and the polyhydroxy bodies in a suitable solvent which is adaptable to azeotropic distillation. It is to be noted that the use of a solvent is not essential but in some instances its use may facilitate the reaction. Likewise, the use of catalyst such as sulfuric acid and other acidic agents may facilitate the reaction.

The proportions of the polyhydric alcohols and carboxy acids and the reaction conditions are calculated to completely esterify the hydroxy groups and to remove by molecular dehydration all of the water corresponding to the hydroxy groups of the polyhydric alcohol. The resultant mixed ester, in some cases, may contain free carboxy groups.

The incorporation of the blown tall oil into the reaction mixture produces a product which is much more effective in the breaking of water-in-oil emulsions than the same product from which the blown tall oil has been omitted. The reactions involved are so complex that the reaction product cannot be described by any simple chemical formula, and hence no reason can be given in the unusual effectiveness of the resultant products in breaking water-in-oil emulsions.

Our preferred alkylolamine is triethanolamine which is a viscous and very hygroscopic liquid which boils at 244 degrees C. at 50 mm. A commercial product which is used for the purposes of the invention contains not more than 2.5% monoethanolamine and not more than 15% diethanolamine and not less than 80% triethanolamine. The neutral equivalent of the commercial product will average about 140 and is entirely satisfactory for our purposes.

Other examples of suitable primary, secondary and tertiary alkylolamines for these purposes are as follows: diethanolamine, octylethanolamine, cyclohexylethanolamine, diisopropanolamine, triisopropanolamine, 2-amino-2-methyl-1-propanol and polyethanolamines. Recently there has become available a commercial product satisfactory for our purposes designated as "amine residue T" which is a still residue from the manufacture of triethanolamine.

The most effective reaction products for the purpose of the invention have been obtained by carrying out the reaction between the reactants in the presence of an acidic salt of a multivalent metal which forms amphoteric hydroxides (e. g., iron, aluminum, chromium and zinc), and the results obtained with zinc salts, especially zinc chloride, have been outstanding. By an acidic salt is meant a salt having an electronegative charge greater than the electronegative charge of the —OH ion. For the most part, these acidic salts are salts of strong acids (e. g., chlorides, nitrates, phosphates, sulfonates, sulfates and sulfamates).

From the fact that varying proportions of acidic salts such as zinc chloride produces different products with alkylolamines, it may be deduced that the metal actually forms a complex either with the alkylolamine or with the reaction product as a whole. In general, the proportion of the acidic salt should be within the range of 0.5% to 8%, and preferably within the range of 2% to 7% by weight of the alkylolamine employed in the reaction. The fact that the quantities of the acidic salt which produce the most effective reaction products are more than catalytic amounts is further evidence that the metallic ion actually forms part of the resultant complex product.

In order to illustrate specifically the new types of materials contemplated for use in accordance with the present invention, the following examples are set forth below as being typical of products suitable for use. It is to be understood, however, that we do not confine ourselves to the specific chemicals, or proportions thereof, set forth in these examples as it will be obvious that equivalents of these chemicals and other pro-equiportions may be used without departing from the spirit of the invention or the scope of the appended claims.

EXAMPLE I

An intermediate was prepared by charging 8 drums (440 gallons) of tall oil into a steel processing kettle with an inlet line to permit the material to be blown with air at elevated temperatures. The tall oil was heated to 200° C. and at this point a stream of air under 5 pounds pressure (gage) was blown into the tall oil with agitation. There was an exothermic reaction which carried the reaction mass to a temperature of 200° C. to 210° C. without external heat being applied. This operation was continued for 36 to 48 hours until the tall oil was sufficiently bodied to form a thread which had elastic characteristics. At this stage of blowing the tall oil was cooled to approximately 125° C. and 4 drums (approximately 210 gallons) of Gray Tower polymers were added to the mass with stirring to yield the finished intermediate.

A second intermediate product was prepared by charging approximately 6,000 pounds of tall oil, 4,000 pounds of polyethylene glycol 400, and 200 pounds of an alkylated aryl sulfonic acid (e. g., isopropyl, monoamyl and/or diamyl napthalene sulfonic acids) into a steel processing kettle. The temperature was raised with agitation and at about 140° C. an aqueous-like distillate began to form. Heating was continued until a total of 430 pounds of distillate had been condensed from the reaction. The maximum temperature during this reaction was about 290° C. The reaction mass was then cooled to 80° C. and pumped over to yield the polyethylene glycol 400 ester of tall oil.

Five thousand seven hundred (5,700) pounds of the above prepared ester of tall oil, 2,250 pounds of the blown tall oil, 2,820 pounds of triethanolamine and approximately 150 gallons of a suitable hydrocarbon fraction such as SO₂ extract were charged into a steel processing kettle. The temperature was raised with agitation to about 120° C., at which point 95 pounds of zinc chloride were added to the mass. The temperature was then elevated and an aqueous distillate began to form at a temperature of 175° C. to 180° C. Heating was continued until a total of 63 gallons of aqueous distillate had been secured. This distillate came over in about 3 hours and at a maximum temperature of 235° C. to 245° C. The mass was cooled to 125 degrees C. and approximately 375 gallons of SO₂ extract were pumped into the mass with agitation. After further cooling the material was pumped over to yield the finished product. This product was found to be an excellent emulsion breaker for regular water-in-oil petroleum emusions.

EXAMPLE II

Three hundred parts (300) of a fatty acid residue consisting chiefly of oleic and linoleic acids, 300 parts of abietic acid, 400 parts of polyethylene glycol 200, and 200 parts of a suitable hydrocarbon diluent were heated until a total of 24 parts of aqueous-like distillate had been secured.

This intermediate mixed ester was then reacted with blown tall oil, triethanolamine, and zinc chloride, in accordance with the directions given in Example I.

From the foregoing examples, it is to be noted that satisfactory products are secured by manufacturing the mixed ester prior to the condensation with the blown tall oil and the alkylolamine. Satisfactory products can also be prepared by reacting the desired dissimilar carboxy compounds, the polyhydroxy compounds, the blown tall oil and the alkylolamine in one step. The alkylolamine may also be reacted with the acidic salt with molecular dehydration prior to the reaction with the mixed ester and the blown tall oil. The proportions of the blown tall oil are preferably within the range of 10 to 25% by weight of the resultant reaction product. The proportions of the mixed ester (or of the total ingredients which form the mixed ester) are preferably within the range of 45 to 65% by weight of the resultant reaction product. The proportions of the alkylolamine are preferably within the range of 20 to 40% by weight of the resultant reaction product. All of the foregoing percentages are based upon calculations which exclude the solvents or diluents used in the reaction. The quantity of the alkylolamine employed is preferably such that the molal ratio of amino groups to acidic groups in the monomeric material is within the range of 3:1 to 1:3.

Catalysts such as the alkylated aryl sulfonic acid, which is employed as an esterification catalyst in Example I, may be omitted if desired but are preferably used to accelerate the esterification reaction. Other well-known types of acidic esterification catalysts may be employed for a similar purpose, as, for example, sulfuric acid and chlorosulfonic acid.

In the preparation of the blown tall oil for the purpose of the invention, the oxidation or blowing of the tall oil is carried out sufficiently long to induce a thickening of the oil. Where air is employed as the blowing agent, this usually requires around 36 to 48 hours at temperatures around 200 to 210° C. until the oil has been sufficiently blown to yield a tacky product when cooled to ordinary room temperature (25° C.).

The above examples are only a few of the many products which may be prepared according to the principles disclosed in the foregoing discussion. Various examples of the many products which answer the description herein made are contemplated; some may be oil soluble and others water soluble, and in many instances they may possess dual solubility to an appreciable extent. The suitability of any of the products for the breaking and resolving of any given emulsion can readily be determined by conventional procedures. The products may be used as such for resolving emulsions of the water-in-oil type or they may be admixed with other demulsifying reagents in varying ratios as required by the problem at hand.

The suitable hydrocarbon vehicle referred to in the examples is sulfur dioxide ($SO_2$) extract. This material is a by-product from the Edeleanu process of refining petroleum in which the undesirable fractions are removed by extraction with liquid sulfur dioxide. After removal of the sulfur dioxide a mixture of hydrocarbons, substantially aromatic in character, remains which is designated in the trade as $SO_2$ extract. Examples of other suitable hydrocarbon vehicles are Gray Tower polymers, toluene, xylene, gas oil, diesel fuel, Bunker fuel and coal tar solvents. The above cited examples of solvents are adaptable to azeotropic distillation as would also be any other solvent which is immiscible with water, miscible with the reacting mass and has a boiling-point or boiling range in excess of the boiling point of water.

The improved demulsifying reagents prepared in accordance with the present invention are preferably used in the proportion of one part of reagent to from 2,000 to 30,000 parts of emulsion either by adding the concentrated product directly to the emulsion or after diluting with a suitable vehicle in the customary manner.

The products prepared in accordance with the invention are very useful in breaking petroleum emulsions, especially those in which the oil is paraffinic or paraffinic-naphthenic, and has been successfully used in breaking water-in-oil petroleum emulsions in the Mid-Continent oil fields, including Oklahoma, Illinois, Kansas, the Gulf Coast, Louisiana and Southwest Texas.

This application is a division of our copending application Serial No. 17,386, filed March 26, 1948.

The invention is hereby claimed as follows:

1. The product of the reaction of a blown tall oil, an alkylolamine, an acidic salt of a metal forming an amphoteric hydroxide and a mixed ester resulting from the reaction of a polyhydric alcohol and a mixture of at least two dissimilar unsaturated carboxy acids wherein at least one of said acids is a monocarboxy carbocyclic natural resin acid and another is a fatty acid having at least 8 carbon atoms in an acyclic chain, the proportions of said acidic salt being within the range of 0.5 to 8% by weight of said alkylolamine, the proportions of the blown tall oil being within the range of 10% to 25% by weight of the resultant reaction product, the proportions of said mixed ester being within the range of 45% to 65% by weight of the resultant reaction product, and the proportions of alkylolamine being within the range of 20% to 40% by weight of the resultant reaction product, the molal ratio of amino groups to acidic groups being within the range of 3:1 to 1:3, and said reaction being effected at temperatures of 175° C. to 300° C. to an extent sufficient to produce a water-wettable, interfacial and surface-active product.

2. The product of the reaction of a blown tall oil, an alkylolamine, zinc chloride, and a mixed ester resulting from the reaction of a polyhydric alcohol and a mixture of at least two dissimilar unsaturated carboxy acids wherein at least one of said acids is a monocarboxy carbocyclic natural resin acid and another is a fatty acid having at least 8 and not more than 32 carbon atoms in an acyclic chain, the proportions of zinc chloride being within the range of 2% to 7% by weight of said alkylolamine, the proportions of the blown tall oil being within the range of 10% to 25% of the resultant reaction product, the proportions of the alkylolamine being within the range of 20% to 40% by weight of the resultant reaction product, and the proportions of the mixed ester being within the range of 45% to 65% by weight of the resultant reaction product, said reaction being effected at temperatures of 175° C. to 300° C. and to an extent sufficient to produce a water-wettable, interfacial and surface-active product.

3. The product of the reaction of a blow tall oil, an alkylolamine, an acidic salt of a metal forming an amphoteric hydroxide and a polyethylene glycol ester of tall oil, the proportions of said acidic salt being within the range of 0.5% to 8% by weight of said alkylolamine, the proportions of the blown tall oil being within the range of 10% to 25% by weight of the resultant reaction product, the proportions of said mixed ester being within the range of 45% to 65% by weight of the resultant reaction product, and the proportions of alkylolamine being within the range of 20% to 40% by weight of the resultant reaction product, the molal ratio of amino groups to acidic groups being within the range of 3:1 to 1:3, and said reaction being effected at temperatures within the range of 175° C. to 300° C. to an extent sufficient to product a water-wettable, interfacial and surface-active product.

4. The product of the reaction of a blown tall oil, triethanolamine, zinc chloride and a polyethylene glycol ester of tall oil under molecularly dehydrating conditions at temperatures within the range of 175° C. to 300° C., the proportions of zinc chloride being within the range of 2% to 7% by weight of the triethanolamine, the proportions of the blown tall oil being within the range of 10% to 25% by weight of the resultant reaction product, the proportions of the triethanolamine being within the range of 20% to 40% by weight of the resultant reaction product, and the proportions of the polyethylene glycol ester being within the range of 45% to 65% by weight of the resultant reaction product, said reaction being only to an extent sufficient to produce a water-wettable, interfacial and surface-active product.

WILLARD H. KIRKPATRICK.
EARL T. KOCHER.

No references cited.